US008707273B2

(12) United States Patent
Imai et al.

(10) Patent No.: US 8,707,273 B2
(45) Date of Patent: Apr. 22, 2014

(54) PRECONDITION GENERATING APPARATUS

(75) Inventors: Takeo Imai, Tokyo (JP); Masahiro Sakai, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 136 days.

(21) Appl. No.: 13/453,006

(22) Filed: Apr. 23, 2012

(65) Prior Publication Data

US 2012/0266133 A1    Oct. 18, 2012

Related U.S. Application Data

(63) Continuation of application No. PCT/JP2009/068351, filed on Oct. 26, 2009.

(51) Int. Cl.
*G06F 9/44* (2006.01)

(52) U.S. Cl.
USPC .......................... 717/126; 717/114; 717/135

(58) Field of Classification Search
None
See application file for complete search history.

(56) References Cited

U.S. PATENT DOCUMENTS

| 2007/0157169 | A1 | 7/2007 | Chen et al. | |
|---|---|---|---|---|
| 2008/0098366 | A1* | 4/2008 | Fong et al. | 717/135 |
| 2008/0301655 | A1* | 12/2008 | Gulwani et al. | 717/156 |
| 2009/0192963 | A1 | 7/2009 | Sankaranarayanan et al. | |
| 2009/0193401 | A1* | 7/2009 | Balakrishnan et al. | 717/144 |
| 2010/0088548 | A1* | 4/2010 | Gulwani et al. | 714/38 |
| 2010/0235818 | A1 | 9/2010 | Sakai et al. | |
| 2011/0055806 | A1* | 3/2011 | Chicherin et al. | 717/106 |

FOREIGN PATENT DOCUMENTS

JP    01-286026    11/1989

OTHER PUBLICATIONS

Dannenberg et al.,"Formal Program Verification using Symbolic Execution", IEEE Transactions on Software Engineering, vol. SE-8, No. 1, Jan. 1982.
Torlak, et al., "Finding Minimal Unsatisfiable Cores of Declarative Specifications", IEEE Transactions on Software Engineering, vol. SE-8, No. 1, Jan. 1982.
Cimatti, Alessandro, et al., "A Simple and Flexible Way of Computing Small Unsatifiable Cores in SAT Modulo Theories", SAT 2007, 10th International Conference on Theory and Applications of Satisfiability Testing, May 28-31, 2007, Lisbon, Portugal.
International Search Report for International Application No. PCT/JP2009/068351 mailed on Jan. 19, 2010.
International Preliminary Report on Patentability for International Application No. PCT/JP2009/068351 issued on May 15, 2012.
Japanese Office Action for Japanese Application No. 2011-538131 mailed on Jul. 26, 2013.

* cited by examiner

*Primary Examiner* — Lewis A Bullock, Jr.
*Assistant Examiner* — Melissa Alfred
(74) *Attorney, Agent, or Firm* — Amin, Turocy & Watson, LLP

(57) ABSTRACT

There is provided a precondition generating apparatus in which a storage stores a set "S" of logical expressions; a creating unit creates a first logical expression being a logical product of the "S", logical expressions of a program and a negation of a logical expression indicating a postcondition; a solver finds a solution that makes the first logical expression true and specifies a set of clauses that cannot be simultaneously true in the first logical expression if not found; wherein the creating unit sets relaxing variables for the logical expressions belonging to the set "S" in the set of clauses wherein the logical expressions indicates a precondition of the program, generates a second logical expression by alleviating the clauses of logical expressions corresponding to the relaxing variables in the first logical expression, and applies same process as in the first logical expression to the second logical expression.

5 Claims, 9 Drawing Sheets

```
if x < 0 then
    y := -x
else
    y := x
endif
```

(A) EXAMPLE OF PROGRAM p : y ≦ 6

(B) EXAMPLE OF POSTCONDITION a : x ≦ 4
b : x ≦ 5
c : x ≧ -5
d : x ≦ 7

(C) EXAMPLE OF PRECONDITION

FIG. 5

PRECONDITION GENERATING APPARATUS

CROSS REFERENCE TO RELATED APPLICATIONS

This application is a continuation of International Application No. PCT/JP2009/068351, filed on Oct. 26, 2009, the entire contents of which is hereby incorporated by reference.

FIELD

The present embodiment relates to a precondition generating apparatus that generates a precondition of a computer program described using an imperative programming language.

BACKGROUND

A method of using a set of a precondition and a postcondition of a program is known as a basic method of indicating specifications and properties of the program in an imperative programming language. An example of a known background theory includes axiomatic semantics that indicates validity of the program by delivering the precondition and the postcondition of the program through an axiom and an inference rule. Hoare logic is known as a specific example of the axiomatic semantics.

JP-A 2005-182806 (Kokai) describes a method of generating a program that satisfies a given specification and therein, a method using the axiomatic semantics is shown as a method example of describing a specification.

BRIEF DESCRIPTION OF THE DRAWINGS

FIG. 5 is a diagram showing an example of a program, an example of a precondition, and an example of a postcondition;

DETAILED DESCRIPTION

Figure 1:
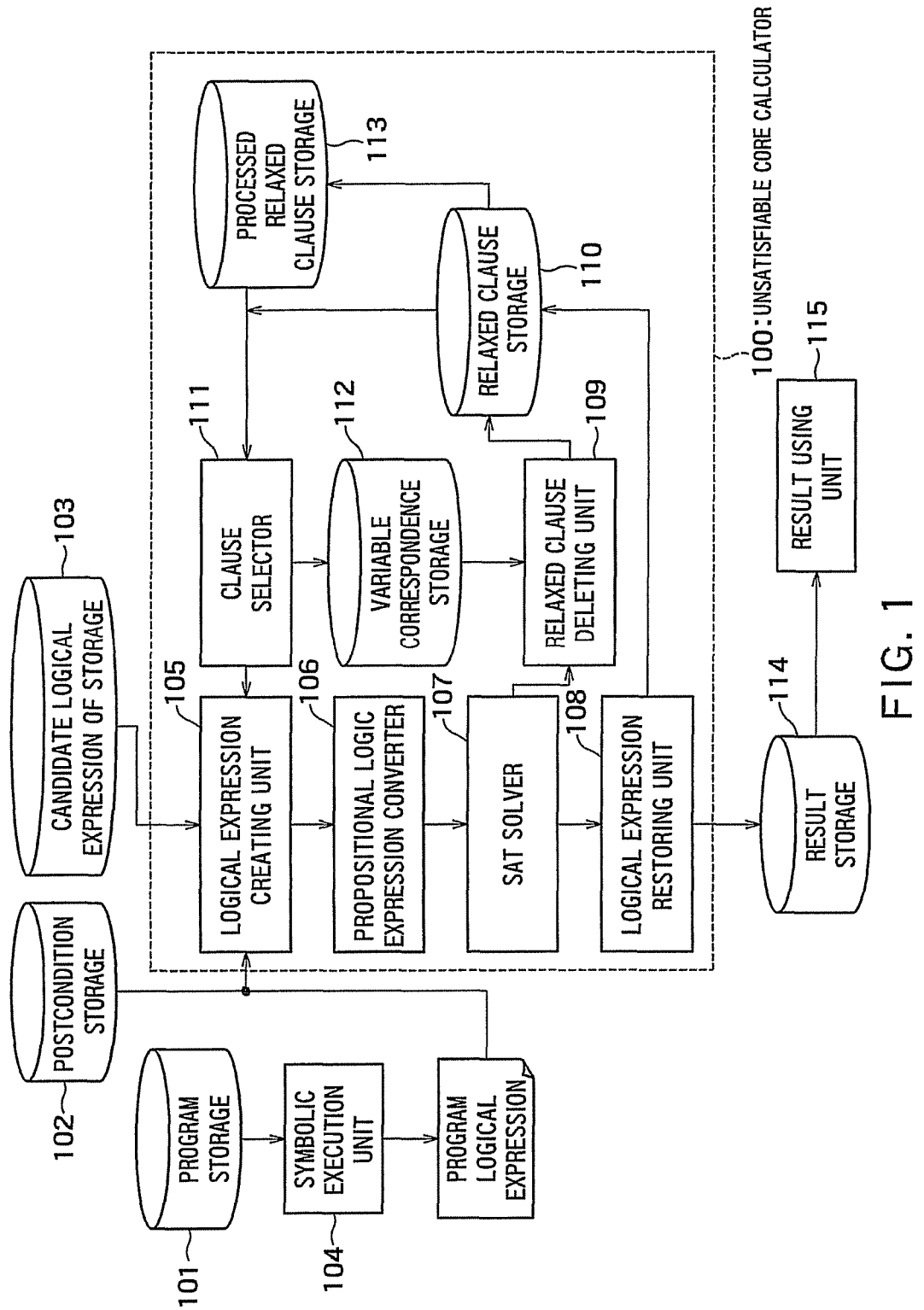
FIG. 1 is a block diagram showing a basic configuration of a precondition generating apparatus according to an embodiment.

According to an embodiment, there is provided a precondition generating apparatus including: a symbolic execution unit, a first storage, a second storage, a logical expression creating unit, a problem solver, a third storage and a fourth storage.

The symbolic execution unit performs symbolic execution on a program described by an imperative programming language to obtain a program logical expression.

The first storage stores a set "S" of a plurality of logical expressions "A"s, the logical expressions "A"s being described using variables included in the program.

The second storage stores a logical expression "B" that is described using variables included in the program, the logical expression "B" indicating a postcondition of the program.

The logical expression creating unit creates a first logical expression that is a logical product of the logical expressions "A"s, the program logical expression and a negation of the logical expression "B".

The problem solver finds a solution that makes the first logical expression true and if the solution does not exist, specifies a set of clauses that cannot be simultaneously true in the first logical expression.

The third storage stores a set of all of logical expressions "A"s included in the set of the clauses as indicating a first precondition of the program.

The fourth storage stores the set of all of the logical expressions "A"s as a relaxed clause set "N1".

The Logical Expression Creating Unit (A1) sets relaxing variables having values of true or false for the logical expressions "A"s belonging to the relaxed clause set "N1", (B1) acquires a set "NN1" that is a set of logical expressions being logical sums between the logical expressions "A"s belonging to the relaxed clause set "N1" and the relaxing variables, (C1) if a number of the logical expressions "A"s belonging to the relaxed clause set "N1" is two or more, acquires a logical sum of negations of the relaxing variables as a variable selection clause "v1", and (D1) generates a second logical expression that is a logical product following items: (a) logical expressions belonging to a set "S-N1" that the relaxed clause set "N1" is subtracted from the set "S", (b) logical expressions belonging to the set "NN1", (c) the variable selection clause "v1", (d) the program logical expression, and (e) a negation of the logical expression "B".

The problem solver finds a solution that makes the second logical expression true and if the solution does not exist, specifies a set of clauses that cannot be simultaneously true in the second logical expression.

The third storage stores a set of all of logical expressions "A"s included in the set of the clauses specified for the second logical expression as indicating a second precondition of the program.

Hereinafter, circumstances of the present embodiment made by the present inventor and the technical background will be described first.

In the context of the axiomatic semantics, between a precondition "Q", a postcondition "R", and a program "S", "{Q}S{R}" holds as an assertion in Hoare logic. This means that if the program "S" is executed under a condition satisfying the precondition "Q", and the execution is terminated "R" is always satisfied (although there is a manner of ensuring the termination of the program "S", the meaning here may not require the termination of "S").

This is equivalent to the following proposition being valid, where a logical expression "$P_s$" indicates the execution of the program "S".

$$Q \wedge P_s \Rightarrow R \qquad (1)$$

It is said that the more general (weaker) the precondition "Q" is, the better the precondition will be. This is because the more general the precondition "Q" is, the more general the prerequisite for executing the program "S" will be. Therefore, the program "S" can be executed under more circumstances while ensuring the postcondition "R".

The precondition "Q" can be expressed as an appropriate conjunction of logical expressions (logical product or ∧). The smaller the set of the logical expressions forming the conjunction is, the more appropriate the precondition will be, because the entire "Q" becomes general.

Therefore, in view of the set of the logical expressions forming the precondition "Q", a more proper precondition can be formed if a subset of the set of the logical expressions that is as small as possible can be acquired.

The present inventor focuses on using an SAT (satisfiability) solver with a delivery function of an unsatisfiable core to find a proper subset for forming a more proper precondition from the set of the logical expressions forming "Q".

The SAT solver is a solver of an SAT problem (satisfiability problem of propositional logic). In recent years, the SAT solver has achieved a dramatic development and is used in many fields. Particularly, there is recently an SAT solver with not only a function of simply delivering a solution of a propositional logic expression provided as an SAT problem (solution that makes the propositional logic expression true), but also, if the solution cannot be delivered (unsatisfiable), a function of obtaining an unsatisfiable core that is a subset of clauses the solution of the conjunction of which cannot be delivered among a plurality of clauses included in the logical expression.

Particularly, a core being a minimal subset of clauses is called a minimal unsatisfiable core. More specifically, the minimal unsatisfiable core is a core in which, if any of the clauses is removed from the subset, a propositional logic expression formed by the conjunction of the subset after the removal becomes satisfiable. An algorithm for calculating the minimal unsatisfiable core is also proposed in recent years. An example of the algorithm is disclosed in Non Patent Literature 1 (E. Torlak et al. Finding Minimal Unsatisfiable cores of Declarative Specifications, FM 2008, LNCS 5014, pp. 326-341, 2008).

The use of the SAT solver with a function of obtaining the above unsatisfiable core can find a proper subset forming the precondition from the set of the logical expressions forming "Q". This is based on the following concept.

The following expression is obtained from a negation of the entire Expression (1).

$$Q \wedge P_s \wedge \neg R \qquad (2)$$

The satisfaction of "{Q}S{R}" is equivalent to (2) being contradictory.

This indicates that if the SAT problem is solved using (2) as a propositional logic expression, the expression is unsatisfiable (there is no solution that makes Expression (2) true).

If the SAT solver with the function of delivering the unsatisfiable core is used, the unsatisfiable core can be obtained from Expression (2). The unsatisfiable core should include "Q'" formed by a subset of logical expressions forming "Q". "Q'" also has a property as a precondition. Therefore, "{Q'}S{R}" holds. According to the description, "Qt" is a precondition more proper than "Q".

Therefore, the use of the SAT solver with the delivery function of the unsatisfiable core can deliver a proper subset (combination of logical expressions) forming the precondition. However, the number of proper combinations of logical expressions corresponding to one postcondition may not be one. Therefore, it is desirable to enumerate the combinations without omission.

However, up to this time, there is no technique of using the delivery function of the unsatisfiable core of the SAT solver to find a proper subset forming the precondition. More specifically, there is an algorithm for enumerating unsatisfiable cores for some kind of another purpose. However, there is no technique for using the SAT solver to enumerate unsatisfiable cores to search for a precondition corresponding to the postcondition.

To obtain a proper subset forming the precondition using the SAT solver, an algorithm disclosed in Non Patent Literature 2 (Mark H. Liffiton, Karem A. Sakallah: Algorithms for Computing Minimal Unsatisfiable Subsets of Constraints. J. Autom. Reasoning 40(1): 1-33(2008)) can be used. The algorithm enumerates all minimal unsatisfiable cores for a given logical expression. However, according to the method, the number of cores exponentially increases with respect to the size of the logical expressions, and there is a problem that unnecessary combinations of logical expressions are enumerated in view of purpose of listing combinations of logical expressions forming the precondition. Furthermore, the performance is not efficient.

In view of the circumstances, the present specification discloses a method of using the SAT solver (or SMT solver described later) with the unsatisfiable core output function to efficiently list the unsatisfiable cores and thereby, efficiently list the combinations of the logical expressions forming the precondition of the program.

Details of the embodiment will now be described by appropriately referencing the drawings.

Definition of terms and notation will be described first. (1) In the present specification, a logical product of all members in a finite set "S" of logical expressions will be described as "$\wedge$ S". If S={A,B,C}, "$\wedge$ S" denotes "A$\wedge$B$\wedge$C". If S=$\phi$ (empty set), "$\wedge$ S" denotes a valid logical expression "true". Furthermore, "$\wedge$ {X1,X2,X3, . . . , Xn}" will be simply written as "$\wedge$ Xi".

Similarly, a logical sum of all members in the finite set "S" of logical expressions will be described as "$\vee$ S". If S={A,B,C}, "$\vee$ S" denotes "A$\vee$B$\vee$C". If S=$\phi$ (empty set), "$\vee$ S" denotes a contradictory logical expression "false". Furthermore, "$\vee$ {X1,X2,X3, . . . ,Xn}" will be simply written as "$\vee$ Xi". (2) As in (1), a direct sum of all sets that are members of a collection "ST" of the sets will be written as "$\cup$S".

(3) Precondition and Postcondition

It is assumed that if a program "C" is executed in a state satisfying a logical expression "Q", and the execution is terminated, a logical expression "R" always holds in the finished state. It is not assumed that "C" is terminated at every time. In this case, the logical expression "Q" will be called a precondition of the program "C", and the logical expression "R" will be called a postcondition of the program "C". The validity of the proposition will be described as "{Q}C{R}".

(4) Unsatisfiable Core

When a logical expression provided by a conjunction of zero or more clauses is unsatisfiable (there is no solution that makes the logical expression true), a subset of clauses a solution of the conjunction of which does not exist in the set of the clauses forming the logical expression will be called an "unsatisfiable core".

FIG. 1 shows a basic configuration of a precondition generating apparatus according to the embodiment.

The precondition generating apparatus of FIG. 1 includes a program storage 101, a postcondition storage 102, a candidate logical expression set storage 103, a symbolic execution unit 104, an unsatisfiable core calculator 100, a result storage 114, and a result using unit 115.

The unsatisfiable core calculator 100 includes a logical expression creating unit 105, a propositional logic expression converter 106, an SAT solver 107, a logical expression restoring unit 108, a relaxed clause deleting unit 109, a relaxed clause storage 110, a clause selector 111, a variable correspondence storage 112, and a processed relaxed clause storage 113.

The propositional logic expression converter 106, the SAT solver 107, and the logical expression restoring unit 108 is equivalent to, for example, a problem solver. The candidate logical expression set storage 103 is equivalent to a first storage. The postcondition storage 102 is equivalent to a second storage. The result storage 114 is equivalent to a third storage. The relaxed clause storage 110 and the processed relaxed clause storage 113 are equivalent to a fourth storage. The storages 103, 102, 114, and 113 may physically be in the same apparatus or in different apparatuses.

Figure 2:
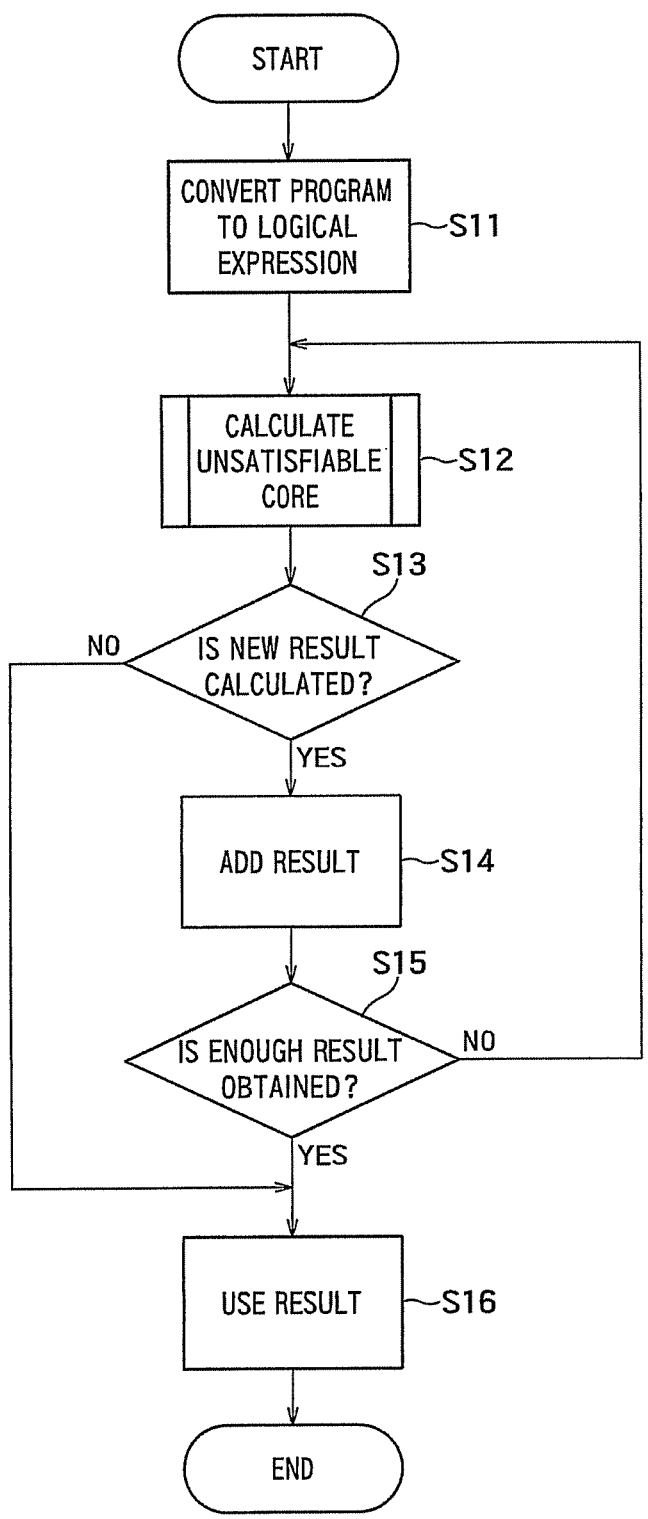
FIG. 2 is a flow chart showing a flow of entire processing of the apparatus of FIG. 1.

FIG. 2 is a flow chart showing a flow of entire processing of the present apparatus. Hereinafter, details of the operations of the members in the apparatus of FIG. 1 will be descried with reference to FIG. 2.

The program storage 101 stores a program "C" (source code). FIG. 5(A) shows an example of the program "C". The program "C" is a program for calculating an absolute value of a variable "x" and storing the value in a variable "y".

The postcondition storage 102 stores a logical expression (corresponding to a logical expression "B") indicating a postcondition "p" of the program "C". FIG. 5(B) shows an example of the logical expression stored in the postcondition storage 102. A logical expression "y≤6" (y is 6 or less) is stored here. The logical expression is equivalent to the postcondition "p". There may be a plurality of logical expressions indicating the postcondition "p". In this case, a logical product of the plurality of logical expressions is equivalent to the postcondition.

The candidate logical expression set storage 103 stores a plurality of logical expressions (candidate logical expressions) as component candidates of the precondition for the program "C". The logical expressions correspond to logical expressions "A"s. FIG. 5(C) shows an example of the logical expressions stored in the candidate logical expression set storage 103. More specifically, the following four logical expressions "a", "b", "c", and "d" are stored here. In the present embodiment, a proper combination of logical expressions for forming the precondition is found from these logical expressions in the storage 103.

a: x≤4 (x is 4 or less)
b: x≤5 (x is 5 or less)
c: x≥−5 (x is −5 or more)
d: x≤7 (x is 7 or less)

In step S11 of FIG. 2, the symbolic execution unit 104 reads the program "C" from the program storage 101 and uses a method of symbolic execution to convert the read program "C" into a format of logical expression to obtain a program logical expression.

Specifically, the logical expression denotes a Boolean-type (type with binary values) expression, which is formed of variables, linear comparison operators, arithmetic operators/logical operators, and the like used in the program. This can be interpreted as a logical expression of first-order logic.

The method of converting a program to a Boolean-type expression by symbolic execution is known for long. In the symbolic execution, the source code is interpreted line by line, a prerequisite given according to a predetermined conversion rule is converted, and in some cases, another condition may be added by a conjunction. Thereby, there is obtained a condition to be satisfied after an interpreted line is the execution. The condition obtained by interpreting a line serves as a prerequisite for interpreting a next line.

For example, Non Patent Literature 3 (R. Dannenberg and G. Ernst, Formal Program Verification Using Symbolic Execution, IEEE Trans. on Software Eng., vol. SE-8, no. 1, January 1982) describes a method in which a combination of a precondition and a postcondition corresponding to a program is provided, symbolic execution is performed based on the precondition to convert the program to a Boolean-type expression, and whether the obtained expression is correct compared to the postcondition is checked to verify the correctness of the program.

Although the precondition is used as the prerequisite (initial condition) in the symbolic execution in the literature, the symbolic execution is possible without any problem even if the prerequisite as the initial condition is omitted (the symbolic execution is possible if there is a source code). There would just be no condition, and a conditional expression is just added as necessary.

The literature describes that separate logical expressions are created by the symbolic execution if there are a plurality of expressions (therefore, the output result of the symbolic execution indicates a set of a plurality of logical expressions, instead of a single logical expression). However, the symbolic execution unit 104 of the present embodiment converts the program "C" to a single logical expression through the symbolic execution.

Specifically, in the case of the program "C" of FIG. 5(A), the symbolic execution unit 104 generates a logical expression of (x<0 ∧ y=−x)∨(x≥0∧y=x) through the symbolic execution.

In step S12, the thus obtained program logical expression, the set of the candidate logical expressions in the candidate logical expression set storage 103, and the logical expression indicating the above postcondition are loaded on the unsatisfiable core calculator 100 to obtain an unsatisfiable core, and a set of logical expressions forming the precondition (partial candidate set) is acquired.

If the partial candidate set is obtained (YES in S13), the partial candidate set is stored in the result storage 114 (S14). A logical product of the logical expressions included in the partial candidate set is equivalent to a precondition. Through a display not shown, the unsatisfiable core calculator 100 notifies the user of a message prompting the user to determine whether an answer is further necessary, i.e. whether to acquire another partial candidate set. The user inputs instruction data through an input interface not shown, and the unsatisfiable core calculator 100 moves the process to the result using unit 115 if the instruction data indicates that an answer is not further necessary (if the instruction data indicates that an enough result is obtained) (S16). If the instruction data indicates acquisition of another partial candidate set, the process returns to the process of the unsatisfiable core calculator 100 (step S12), and second processing is executed.

On the other hand, if it is determined that the partial candidate set is not obtained in step S13, the process moves to a process by the result using unit 115 (S16).

The process may return to step S12 without the determination by the user in step S15 to repeat the process. In this case, the process moves to the process by the result using unit 115 (S16) when it is determined that the calculation result (partial candidate set) cannot be obtained in step S13 (NO).

If an SAT solver ensures the minimality of the unsatisfiable core obtained in step S12, it can be ensured that the obtained result does not include redundant conditions. If such an SAT solver is not used, another method may be implemented to further narrow down the obtained set of the logical expressions to eliminate the redundant conditions (logical expressions).

Figure 3:
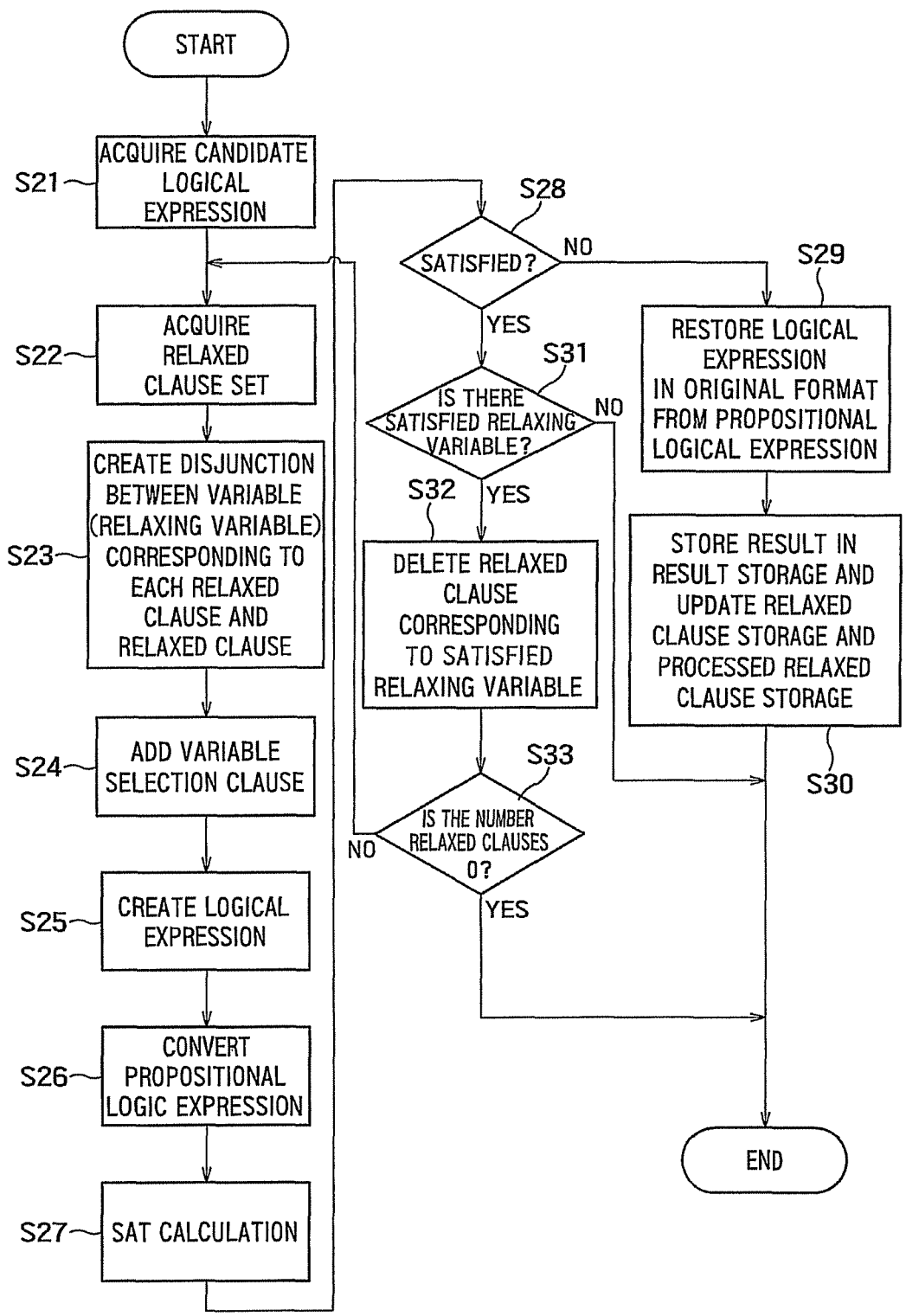
FIG. 3 is a flow chart showing a flow of an unsatisfiable core calculating process.

FIG. 3 shows a flow of the process by the unsatisfiable core calculator 100 executed in step S12. It is important here that if one or more partial candidate sets (proper sets of logical expressions forming the precondition) are already obtained, a different partial candidate set needs to be obtained. Therefore, a process using a relaxed clause set and a processed relaxed clause set described later is newly implemented in the present embodiment. The relaxed clause storage 110, the variable correspondence storage 112, and the processed relaxed clause storage 113 do not store anything yet when the flow of FIG. 2 is started.

In step S21, the logical expression creating unit 105 in the unsatisfiable core calculator 100 receives, as inputs, a candidate logical expression set "S" from the candidate logical expression set storage 103, receives a program logical expression "$P_c$", which is obtained by converting the program, from the symbolic execution unit 104, and receives a logical expression "post", which indicates the postcondition, from the postcondition storage 102.

Steps S22 to S24 are skipped because the relaxed clause storage 110 and the processed relaxed clause storage 113 do not store anything at this point, and the process proceeds to step S25.

In step S25, the logical expression creating unit 105 generates a logical expression (first logical expression) according to the following expression based on the program logical expression "$P_c$", the candidate logical expression set "S", and the postcondition "post" acquired in step S21. The logical expression denotes a logical product of a plurality of logical expressions belonging to the set "S", a program logical expression, and a negation of the logical expression indicating the post condition. F=∧ S∧ $P_c$∧ ¬, post $$F = \wedge S \wedge P_c \wedge \neg \text{post}$$

In the present example shown in FIGS. 5(A) to 5(C), the following logical expression (first logical expression) is generated. The expression in parentheses is equivalent to a clause of the logical expression.

$$F_1 = a \wedge b \wedge c \wedge c \wedge P_c \wedge p = (x \leq 4) \wedge (x \geq 5) \wedge (x \geq -5) \wedge (x \geq 7) \wedge \neg((x<0 \wedge y=-x) \vee (x \geq 0 \wedge y=x)) \wedge (y>6)$$

In step S26, the propositional logic expression converter 106 converts the logical expression "F" to a format of a propositional logic expression that can be processed by the SAT solver 107.

The propositional logic is one of the systems of mathematical logic. In the propositional logic, the logical expression can be expressed by a literal, or by combining zero or more literals with operators which includes logical sum (disjunction, or ∨), logical product (conjunction, or ∧), and implication (→). The literal denotes a variable (variable with a binary value) or a value obtained by applying a NOT operator (¬) to the variable. Various systems of the conversion algorithm from the logical expression to the propositional logic expression are known, and the conversion algorithm is not essential in the present embodiment. Therefore, the following description will be simple.

In the present example, an integer is interpreted by five bits with a sign, and a negative number is expressed by 2's complement. The five bits forming the variable "x" are indicated by five Boolean-type variables of "x0" to "x4" in order from the least significant bit, and similarly, the five bits forming the variable "y" are indicated by five Boolean-type variables of "y0" to "y4" in order from the least significant bit. At the same time, a conversion method related to linear comparisons (=, ≤, ≥, <, >) of an integer expression and a NOT operation (¬) is set, and the conversion is performed according to the system (as for the system, if, for example, MathSAT described later can be used, the conversion can be performed according to the conversion system). In the present example, a conversion to a conjunctive normal form (CNF), which is adopted by many SAT solvers as a normal form of input, is made. This denotes a logical expression describing a combination (clause) of literals by a disjunction, in a format of a combination by a conjunction.

In the present example, the following expression can be obtained as a result of converting the logical expression of "$F_1$". For the simplification, the result of conversion is shown for each of "a", "b", "c", "d", "Pc", and "¬ p" that form the expression of "$F_1$". The ultimate form of the actual conversion result is a connection of all these clauses by a conjunction.

a: (x4∨¬ x3)∧ (x4∨¬ x2∨¬ x1)∧ (x4∨¬ x2∨¬ x0)
b: (x4∨¬ x3)∧ (x4∨¬ x2∨¬ x1)
c: (¬ x4∨ x3)∧ (¬ x4∨ x2∨ x1)∧ (∨ x4¬ x2∨ x0)
d: (x4∨¬ x3)
Pc:
(x4∨¬ x3∧ y3)∨¬ (x4∨ x3∨ y3)∧ (x4∨¬ x2∨¬ y2)∧ (x4 ∨ x2∨ y2)
∨¬ (x4∨¬ x1∧ y1)∧ (x4∨ x1∧ y1)¬ (x3∨ x0∨ y0)∨ ∧ (x3 ∨ x0∨ y0)
∨¬ (∧ x4∧ x3∧ y3)¬ (∨ x4¬ x3∧ y3)∨ (∨ x4∨¬ x2¬ y2) ∨ (∨ x4∧ x2∨¬ ¬ y2)
∨¬ (∧ x4¬ x1∨¬ y1)∨ (¬ x4∨¬ x1¬ y1)∨¬ (∧ x4∧ x0 ¬ y0)∨ (∨ x4∨ x0∨¬ y0)
∨¬ p:∨ y4¬ (y3¬ y2)∧ (y3∧ y1)∧ (y3∨ y0)

In step S27, the SAT solver 107 receives the propositional logic expression as an input, solves a satisfiability problem for obtaining a solution that makes the propositional logic expression true, acquires the solution if the propositional logic expression can be made true, and calculates the unsatisfiable core if the propositional logic expression cannot be made true (i.e. if the propositional logic expression is unsatisfiable). The calculated unsatisfiable core includes a set of clauses that cannot be simultaneously true, in a format of propositional logic expression. For example, if "a", "c", and "Pc" cannot be simultaneously true, the calculated unsatisfiable core includes these in a format of propositional logic expression.

If the unsatisfiable core is calculated, i.e. if the propositional logic expression is not satisfied (NO in S28), the logical expression restoring unit 108 restores the original format of the logical expressions from the obtained unsatisfiable core (S29). All candidate logical expressions included in the restored set of the logical expressions are specified, and the specified set of the candidate logical expressions (partial candidate set) is stored in the result storage 114 as a set indicating the precondition (S30). A logical product of the specified candidate logical expressions is equivalent to the precondition.

The relaxed clause set stored in the relaxed clause storage 110 is added to the processed relaxed clause storage 113 as a processed relaxed clause set, and the specified set of the candidate logical expressions is overwritten in the relaxed clause storage 110 as a relaxed clause set (the relaxed clause set lastly stored in the relaxed clause storage 110 is deleted) (S30).

If the unsatisfiable core is not calculated in step S27, i.e. if the propositional logic is satisfied (YES in S28), the present flow is finished through "NO" in step S31 (determination of step S31 is "NO" because there is no relaxing variable (described later) yet in the first flow), and the process further proceeds to step S16 through "NO" in step S13 of FIG. 2. However, if the first flow ends up this way, the flow of FIG. 2 can be finished without proceeding to the process by the result using unit 115, because the result storage 114 does not store anything.

Figure 7:
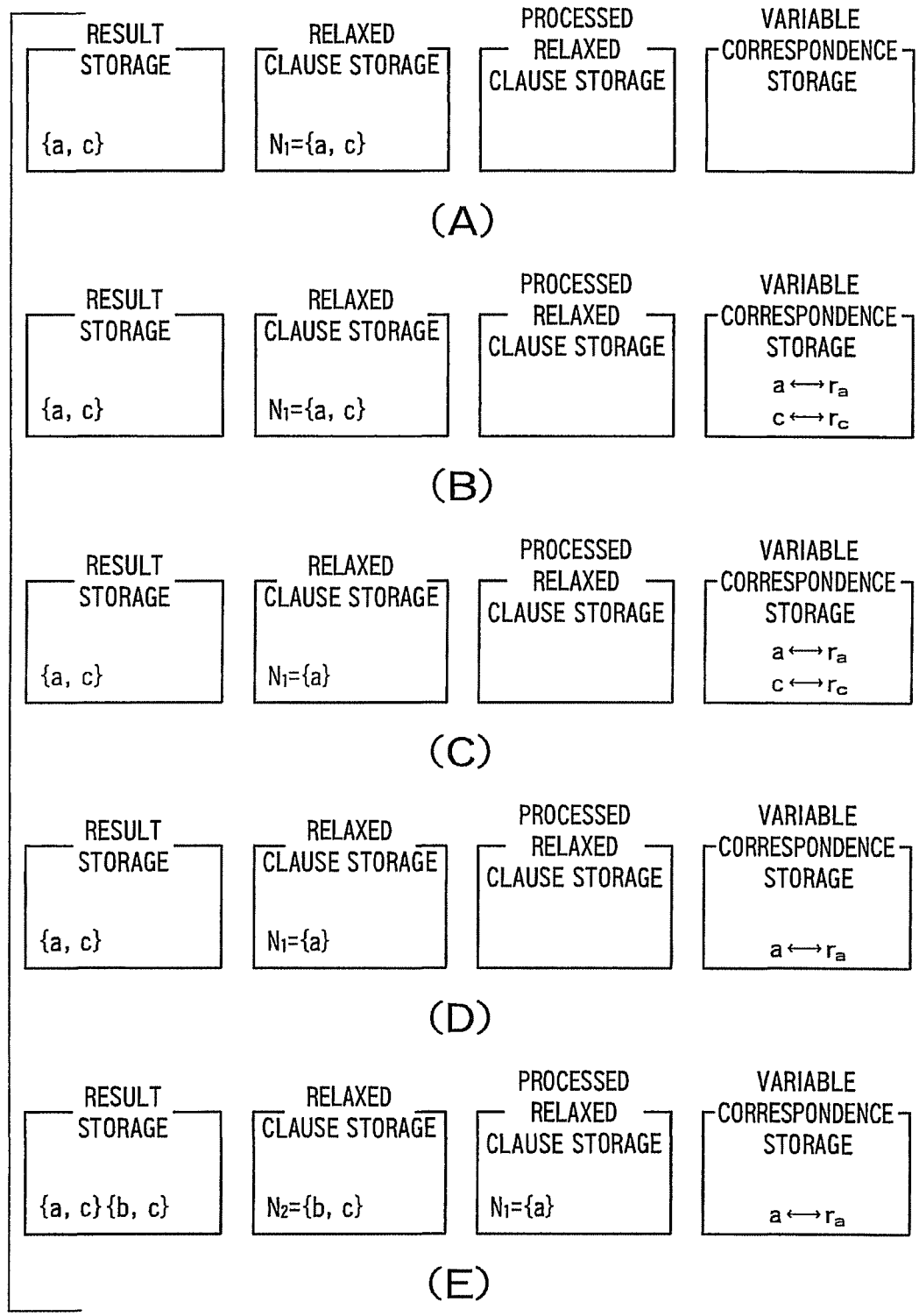
FIG. 7 is a first supplemental explanatory diagram for explaining the unsatisfiable core calculating process.

In the present example, it is assumed that the unsatisfiable core calculator 100 obtains the unsatisfiable core (NO in S28), the logical expression restoring unit 108 restores the core to a set of original logical expressions, all candidate logical expressions are specified from the restored result, and "{a,c}" is obtained. This "{a,c}" is stored in the result storage 114 as shown in FIG. 7(A) as a logical expression set indicating the precondition (first precondition) (S30). This "{a,c}" is also stored in the relaxed clause storage 110 as a relaxed clause set (equivalent to a relaxed clause set "N1") (S30). The members (logical expressions) in the relaxed clause set are called relaxed clauses.

The relaxed clause storage 110 does not store anything before "{a,c}" is stored. Therefore, content to be moved to the processed relaxed clause storage 113 does not exist in the relaxed clause storage 110, and the processed relaxed clause storage 113 does not store anything at this point.

For the convenience, it is assumed that the number of already obtained unsatisfiable cores is "k". (Although the present apparatus does not particularly have to store and calculate the value "k", the value will be used in the following description for the convenience. Since one unsatisfiable core is obtained, k=1 here).

The process returns to step S12 through "NO" of step S15 of FIG. 2, and the process of the present flow (second flow) is started again from step S21.

In step S21, as in the first flow, the logical expression creating unit 105 acquires the program logical expression, the postcondition, and the candidate logical expression set. The data acquired in the first flow may be stored inside, and in that case, the stored data may be used.

In step S22, the clause selector 111 receives a relaxed clause set from the relaxed clause storage 110 and receives a processed relaxed clause set from the processed relaxed clause storage 113. The processed relaxed clause storage 113 includes (k−1) processed relaxed clause sets only if and the relaxed clause storage includes one relaxed clause set only if k≥1.

The clause selector 111 receives (k−1) processed relaxed clause sets "$N_j$" (1≤j<k−1) from the processed relaxed clause storage 113 if k≥2. One relaxed clause set "$N_k$" stored in the relaxed clause storage 110 is also received. The clause selector 111 collectively handles the received (k−1) processed relaxed clause sets "$N_j$" (1≤j<k−1) and one relaxed clause set "$N_k$" as k sets "{Ni}" (1≤i≤k).

The clause selector 111 receives one relaxed clause set "$N_k$" stored in the relaxed clause storage 110 as "Ni(i=1)" if k=1.

In the present example, k=1. A relaxed clause set "{a,c}" is stored in the relaxed clause storage 110, and the processed relaxed clause storage 113 does not store anything. Therefore, the clause selector 111 acquires one relaxed clause set "{a, c}".

In step S23, based on the received "{Ni}", the clause selector 111 sets binary variables (relaxing variables) corresponding to the logical expressions that are members of "Ni" wherein each binary variable (relaxing variable) has true or false. Correspondingly to the same logical expression, one relaxing variable is set. A set "Ri" (1≤i≤k) of variables (relaxing variables) set for the logical expressions that are members of "Ni" is generated for each "i". Each "Ni" is a subset of "S". The clause selector 111 stores a correspondence between the relaxing variables and the logical expressions in the variable correspondence storage 112. The clause selector 111 further outputs each "{Ni}" and the relaxing variable set "{Ri}" corresponding to each "{Ni}" to the logical expression creating unit 105.

In the present example, S={a,b,c,d}, k=1, and $N_1$={a,c}. Therefore, a relaxing variable "$r_a$" corresponding to a logical expression "a" and a relaxing variable "$r_c$" corresponding to a logical expression "c" are set to create "$R_1$={$r_a,r_c$}" that is a set of the relaxing variables "$r_a$" and "$r_c$". The relaxing variables "$r_a$" and "$r_c$" are binary of true or false. The clause selector 111 stores the correspondence between the logical expression "a" and the relaxing variable "$r_a$" and the correspondence between the logical expression "c" and the relaxing variable "$r_c$" in the variable correspondence storage 112 as shown in FIG. 7(B). The clause selector 111 also outputs "$N_1$={a,c}" and "$R_1$={$r_a,r_c$}" to the logical expression creating unit 105.

To deepen the understanding, another example will be considered, where S={a,b,c,d,e,f,g,h} (a,b,c,d,e,f,g,h are logical expressions), k=3, $N_1$={b,c}, $N_2$={d}, and $N_3$={a,c,g}. In this case, relaxing variables "$r_a$", "$r_b$", "$r_c$", "$r_d$", and "$r_g$" are set, and "$R_1$={$r_b,r_c$}", "$R_2$={$r_d$}", and "$R_3$={$r_a,r_c,r_g$}" are generated. The correspondence between the logical expression "a" and the relaxing variable "$r_a$", the correspondence between the logical expression "b" and the relaxing variable "$r_b$", the correspondence between the logical expression "c" and the relaxing variable "$r_c$", the correspondence between the logical expression "d" and the relaxing variable "$r_d$", and the correspondence between the logical expression "g" and the relaxing variable "$r_g$" are stored in the variable correspondence storage 112. "$R_1$={$r_b,r_c$}", "$R_2$={$r_d$}", and "$R_3$={$r_a,r_c,r_g$}" are transferred to the logical expression creating unit 105 along with "$N_1$={b,c}", "$N_2$={d}", and "$N_3$={a,c,g}".

In step S23, the logical expression creating unit 105 uses "{Ni}" received from the clause selector 111 and the corresponding relaxing variable set "Ri" to create a set "NN" including disjunctions between the logical expressions belonging to "{Ni}" and the relaxing variables corresponding to the logical expressions.

In the present example, "$N_1$={a,c}" and "$R_1$={$r_a, r_c$}" are used to create the set "NN" including a disjunction "(a∨$r_a$)" between the relaxing variable "$r_a$" and the corresponding logical expression "a" and a disjunction "(c∨$r_c$)" between the relaxing variable "$r_c$" and the corresponding logical expression "c". More specifically, NN={(a∨$r_a$),(c∨$r_c$)}. This is equivalent to, for example, a set "NN1".

In the above-stated other example, "$N_1$={b,c}", "$N_2$={d}", and "$N_3$={a,c,g}" as well as "$R_1$={$r_b,r_c$}", "$R_2$={$r_d$}", and "$R_3$={$r_a,r_c,r_g$}" are used to create NN={(a∨$r_a$),(b∨$r_b$),(c∨$r_c$),(d∨$r_d$),(g∨$r_g$)}.

In step S24, the logical expression creating unit 105 creates a variable selection clause "V" based on the relaxing variable set "Ri". A creation method of "V" will be shown. More specifically, for each "Ri", a disjunction of negations of all variables is acquired as "v" if the number of members of "Ri" is two or more (i.e. the number of logical expressions belonging to "Ni" corresponding to "Ri" is two or more). If the total number of the members of "Ri" is one (i.e. the number of logical expressions belonging to "Ni" corresponding to "Ri" is one), nothing is set as "v" (synonymous with setting "v=true"). A conjunction of "v" acquired for each "Ri" is taken to form "V".

This causes the SAT solver 107 to ensure in a later step that at least one variable is false if there are a plurality of variables that are members in each "Ri".

In the present example, since only "$R_1$={$r_a,r_c$}" exists, a variable selection clause "v=V=(¬$r_a$∨¬$r_c$)" is created. This is equivalent to, for example, a variable selection clause "v1". "$(\neg r_a \vee \neg r_c)$" requires that one of "$r_a$" and "$r_c$" be false (0).

In the above-stated other example,
(1) "$v=(\neg r_b \vee \neg r_c)$" is created for "$R_1=\{r_b,r_c\}$". This requires that one of "$r_b$" and "$r_c$" be false (0).
(2) Nothing is set to "v" for "$R_2=\{r_d\}$".
(3) "$v=(\neg r_a \vee \neg r_c \vee \neg r_g)$" is created for "$R_3=\{r_a,r_c,r_g\}$". This requires that at least one of "$r_a$", "$r_b$", and "$r_c$" be false.

Therefore, a conjunction of all "v" is taken to create $$V = (\neg r_b \vee \neg r_c) \wedge (\vee \neg r_a \vee \neg r_c \neg r_g).$$

The implementation of the variable selection clauses can list as many unsatisfiable cores as possible while permitting the possibility of partially overlapping of clauses (candidate logical expressions here) between the already obtained unsatisfiable core(s) and the unsatisfiable core to be obtained next.

In step S25, the logical expression creating unit 105 creates the following logical expression "F" based on the obtained set "Ni", set "NN", and variable selection clause "V". The logical expression "F" indicates a logical product of logical expressions belonging to a set "(S−(∪Ni))", logical expressions belonging to the set "NN", the variable selection clause "V", a program logical expression "P", and a negation of logical expression indicating the postcondition wherein "(S−(∪Ni))" is that a sum of the set "Ni" is subtracted from the set "S". "(S−(∪Ni))" denotes a set of logical expressions not included in the relaxed clause set and the processed relaxed clause set. The expression "F" corresponds to "F=∧S∧$P_c$∨¬ post" shown above if items related to the set "Ni", the set "NN", and the variable selection clause "V" are removed.

$$F = \wedge (S-(\cup Ni)) \wedge (\wedge NN) \wedge V \wedge P \vee \neg \text{ post}$$

In the example,
S={a,b,c,d},
$N_1$={a,c},
NN={(a∨$r_a$),(c∨$r_c$)}, and
V=($\neg r_a \vee \neg r_c$). Therefore,
$F_2$=(a∧$r_a$)∧ o∨ (c∨$r_c$)¬ d∨¬ (∧$r_a$∧$r_c$)∧$P_c$∨¬ post.

"$F_2$" corresponds to, for example, a second logical expression.

As described, "($\neg r_a \vee \neg r_c$)" requires that one of "$r_a$" and "$r_c$" be false (0). Therefore, the logical expression "$F_2$" requires that one of the logical expressions "a" and "c" be true, while the other does not have to hold true. The above use of the relaxing variables "$r_a$" and "$r_c$" can alleviate the conditions for the clauses of the logical expressions "a" and "c" in the logical expression "$F_1$" used first.

In the above-stated other example,
S={a,b,c,d,e,f,g,h},
$N_1$={b,c}, $N_2$={d}, $N_3$={a,c,g},
NN={(a∨$r_a$),(b∨$r_b$),(c∨$r_c$),(d∨$r_d$),(g∨$r_g$)}, and
V=($\neg r_b \neg r_c$)∨¬ (∨¬ $r_a$∨¬ $r_c$∧$r_g$).
Therefore,
$F_3$=(a∨¬ $r_a$)∨¬ (b∨ $r_b$)∨ (c∧ $r_c$)∧ (d∧$r_d$)∧ (e)∧ (f)∧ (g ∨ $r_g$)∨ (∨¬ $r_b$¬ $r_c$)¬ (∧$r_a$∧¬ $r_c$∧$r_g$)∧P∨ post.

In step S26, the propositional logic expression converter 106 converts the logical expression "F" to a format of propositional logic expression. In step S27, the SAT solver 107 solves the obtained propositional logic expression. If a solution that makes the logical expression "F" true is not obtained (NO in S28), the process proceeds to S29. If a solution is obtained (YES), the process proceeds to step S31.

In the present example, when the logical expression "$F_2$" is converted to the propositional logic expression, the relaxing variable is developed to each of clauses after the corresponding relaxed clause is converted. Although not particularly described below, the variable selection clause is added to each clause in the converted propositional logic expression without change. In the propositional logic expression (conversion results) obtained by converting the logical expression "$F_2$", only "a∨ $r_a$" and "c∨ $r_c$" that are changed from "$F_1$." will be described. The rest of the clauses (other than the variable selection clauses) included in "$F_2$" equals to the clauses of "$F_1$".

$$a \vee r_a : (x4 \vee \neg x3 \vee \neg r_a) \vee \neg (x4 \wedge x2 \vee \neg x1 \vee \neg r_a) \vee (x4 \vee x2 \vee x0 \vee r_a)$$

$$c \neg r_c : (\wedge x4 \wedge x3 \vee r_c) \vee (\vee x4 \vee x2 \neg x1 \wedge r_c) \vee (\neg x4 \vee x2 \vee x0 \vee r_c)$$

The propositional logic expressions converted from the logical expression "$F_2$" are satisfiable, and the SAT solver can obtain a solution that makes the propositional logic expression true. It is assumed here that a solution $r_c$=true, x=−8 (x4=x3=true, x2=x1=x0=false), y=8, (y4=false, y3=true, y2=y1=y0=false) is obtained. Since the solution is obtained, the process proceeds to step S31.

In step S31, whether there is a relaxing variable of true in the solution obtained in step S27 is checked. If there is no relaxing variable of true (NO in S31), it is determined that the calculation result (partial candidate set) cannot be further obtained, and the flow of FIG. 3 is finished. On the other hand, if there is a relaxing variable of true (YES in S31), the process proceeds to step S32. In the present example, there is a relaxing variable "$r_c$" of true in the solution, and the process proceeds to step S32.

In step S32, the logical expression (relaxed clause) corresponding to the true relaxing variable is read from the variable correspondence storage 112. The read logical expression (relaxed clause) is deleted from the relaxed clause set "$N_k$" stored in the relaxed clause storage 110.

In the present example, the correspondence between the logical expression "a" and the relaxing variable "$r_a$" and the correspondence between the logical expression "c" and the relaxing variable "$r_c$" are stored in the variable correspondence storage 112. Therefore, the logical expression "c" corresponding to the true relaxing variable "$r_c$" is read. The logical expression (relaxed clause) "c" is deleted from the relaxed clause set "$N_1$={a,c}" in the relaxed clause storage 110. As a result, the relaxed clause set in the relaxed clause storage 110 is "$N_1$={a}" as shown in FIG. 7(C).

In the above-stated other example, if a solution that makes "$r_g$" true is obtained, the logical expression (relaxed clause) "g" is deleted from the relaxed clause set "$N_3$", and "$N_3$={a, c}" is obtained.

In step S33, the unsatisfiable core calculator 100 determines whether the relaxed clause set "$N_k$" has become an empty set as a result of the deletion of the relaxed clause in step S32, i.e. whether the number of members of the relaxed clause set "$N_k$" is zero. If the set has become an empty set (YES in S33), it is determined that a new calculation result cannot be obtained, and the flow of FIG. 3 is finished. On the other hand, if the set has not become an empty set (NO in S33), the process returns to the process by the clause selector 111 of step S22, and the calculation is performed again based on the updated relaxed clause set "$N_k$".

In the present example, the relaxed clause set is "$N_1$={a}" as a result of the deletion of the relaxed clause "c", and the process returns to step S22 because "$N_1$" is not an empty set.

In steps S22 to S25, "$N_1$={a}" serves as the relaxed clause set, and the same process as described above is repeated. As a result, the relaxing variable "$r_a$" is set, and the following logical expression "$F_4$" is created. As shown in FIG. 7(D), the correspondence between the logical expression "a" and the relaxing variable "$r_a$" is stored in the variable correspondence storage 112. The logical expression "$F_4$" is equivalent to, for example, a second logical expression.

$$F_4 = (a \lor r_a) \land b \land c \land d \land r_a \land P_c \land \neg p$$

The propositional logic expression converter 106 converts the logical expression "$F_4$" to a propositional logic expression (S26), and the SAT solver 107 executes the same process (S27). As a result, the logical expression "$F_4$" is not satisfied (NO in S28), and the SAT solver 107 obtains an unsatisfiable core. The logical expression restoring unit 108 converts the unsatisfiable core and specifies candidate logical expressions from the conversion result, and a set "{b,c}" is obtained (S30).

The result storage 114 additionally stores the result "{b,c}" as indicating the precondition (second precondition), as shown in FIG. 7(E) (S30).

The relaxed clause storage 110 adds the relaxed clause set "$N_1=\{a\}$" currently stored inside to the processed relaxed clause storage 113 as the processed relaxed clause set "$N_1$" (at this point, two unsatisfiable cores are obtained in total, and k=2) and overwrites the content of the relaxed clause storage 110 with the obtained result "$N_2=\{b,c\}$" (S30).

Therefore, at this point, "{a,c}" and "{b,c}" are stored in the result storage 114, the relaxed clause set "$N_2=\{b,c\}$" is stored in the relaxed clause storage 110, and the processed relaxed clause set "$N_1=\{a\}$" is stored in the processed relaxed clause storage 113.

The unsatisfiable core calculator 100 asks the user whether an answer is further necessary (step S15 of FIG. 2). If the user inputs an instruction indicating that an answer is further necessary (NO), the process of the flow (third flow) of FIG. 3 is executed again in step S12.

Figure 8:
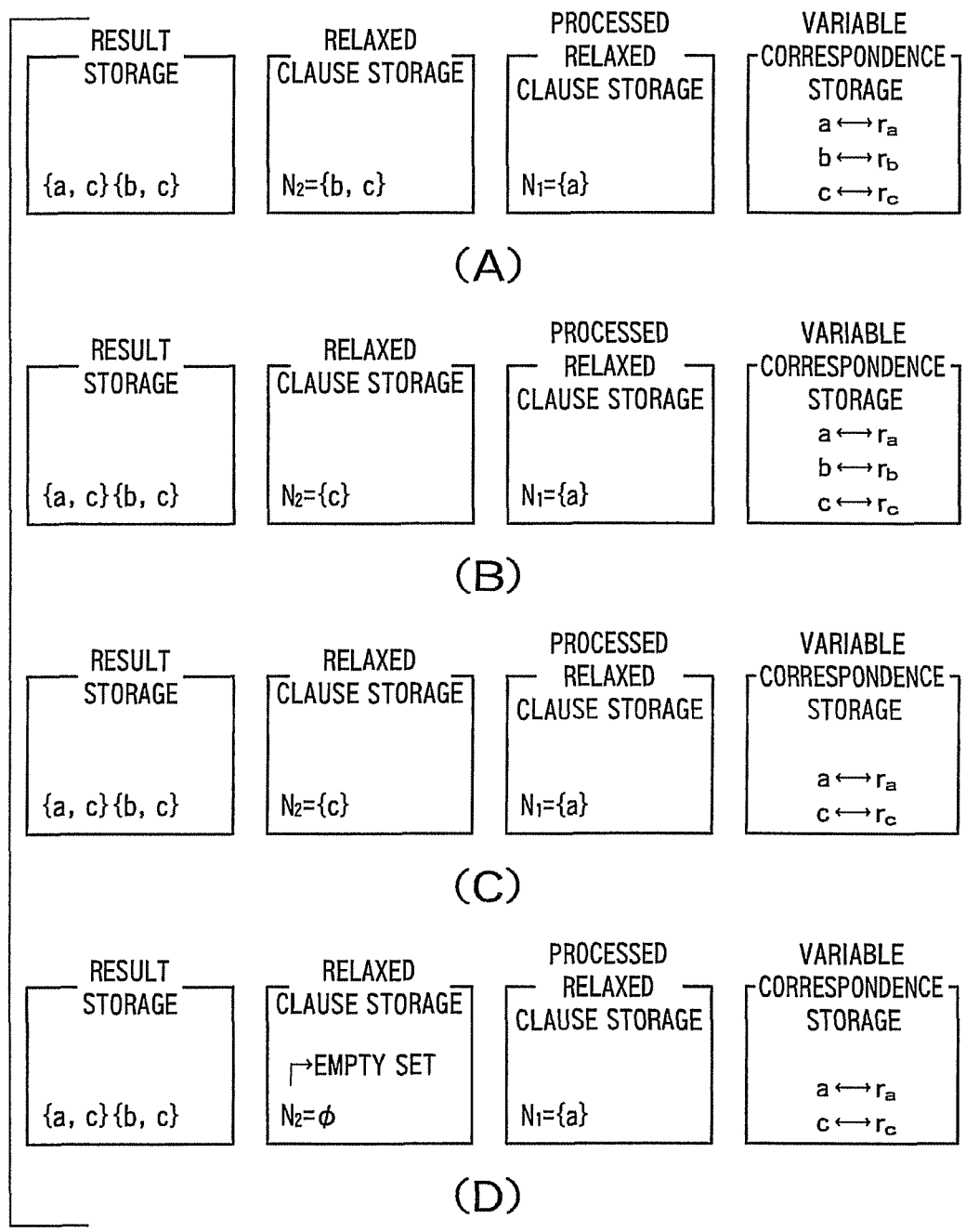
FIG. 8 is a second supplemental explanatory diagram for explaining the unsatisfiable core calculating process.

Here, "$N_1=\{\{a\}\}$" is provided as the processed relaxed clause set, and "$N_2=\{b,c\}$" is provided as the relaxed clause set. Therefore, as shown in FIG. 8(A), the variable correspondence storage 112 stores the correspondence between the logical expression "a" and the relaxing variable "$r_a$", the correspondence between the logical expression "b" and the relaxing variable "$r_b$", and the correspondence between the logical expression "c" and the relaxing variable "$r_c$" (S22). The logical expression creating unit 105 creates the following logical expression "$F_5$" (S23 to S25). The logical expression "$F_5$" is equivalent to, for example, a third logical expression.

$$F_5 = (a \lor r_a) \lor (b \land r_b) \land (c \lor r_c) \neg d \lor \neg (\land \neg r_b \land r_c) \land Pc \land p$$

The logical expression "$F_5$" is converted to a propositional logic expression, and the SAT solver 107 performs the SAT calculation. As a result, a solution of $r_a$=true, $r_b$=true, x=7, and y=7 is obtained (YES in S28).

Since there are true relaxing variables "$r_a$" and "$r_b$" (YES in S31), the relaxed clause deleting unit 109 deletes the logical expression (relaxed clause) "b" corresponding to the relaxing variable "$r_b$" from the relaxed clause set "$N_2=\{b,c\}$" to obtain "$N_2=\{c\}$" as shown in FIG. 8(b). There is no logical expression (relaxed clause) "a" corresponding to the relaxing variable "$r_a$" in the relaxed clause set "$N_2$", and therefore, the process for the variable "$r_a$" is not executed. As a result of the deletion, "$N_2=\{c\}$", and the number of relaxed clauses is one (NO in S33). Therefore, the process returns to step S22.

In returned step S22, the clause selector 111 executes the process again based on the updated "$N_k$" (here, "$N_2=\{c\}$"). "$N_2=\{c\}$" is stored in the relaxed clause storage 110, and "$N_1=\{a\}$" is stored in the processed relaxed clause storage 113. Therefore, the correspondence between the logical expression "a" and the relaxing variable "$r_a$" and the correspondence between the logical expression "c" and the relaxing variable "$r_c$" are stored in the variable correspondence storage 112. In steps S23 to S25, the logical expression creating unit 105 creates the following logical expression "$F_6$". The logical expression "$F_6$" is equivalent to, for example, a third logical expression.

$$F_6 (a \lor r_a) \land b \land (c \land r_c) \land d \lor Pc \land \neg p$$

The propositional logic expression converter 106 converts the expression "$F_6$" to a propositional logic expression (S26), and the SAT solver 107 performs the SAT calculation (S27). As a result, a solution of $r_a$=true, $r_c$=true, x=−8, and y=8 is obtained (YES in S28).

Since there are true relaxing variable "$r_a$" and "$r_c$" (YES in S31), the relaxed clause deleting unit 109 deletes the logical expression (relaxed clause) "c" corresponding to the relaxing variable "$r_c$" from the relaxed clause set "$N_2$" in the relaxed clause storage 110 as shown in FIG. 8(D) (S32).

As a result of the deletion, the relaxed clause set "$N_2$" becomes an empty set (NO in S33). Therefore, the process of the present flow is finished, and the process returns to step S13 of FIG. 2. Since a new calculation result is not obtained (NO in S13), the unsatisfiable core calculator 100 determines that a further result cannot be obtained and moves the process to the result using unit 115.

In the present example, the unsatisfiable core is not calculated in the third flow. However, if the unsatisfiable core is calculated, a set of the candidate logical expressions is specified from the calculated unsatisfiable core as in the second flow, and the set is stored in the result storage 114 as a set indicating the precondition (third precondition) (S30). The relaxed clause storage 110 and the processed relaxed clause storage 113 are further updated (S30), and if necessary (NO in S12), a fourth flow is performed.

In the present example, two logical expression sets (partial candidate sets) "{a,c}" and "{b,c}" are ultimately stored in the result storage 114 as shown in FIG. 8(D). These two indicate that −5≤x≤4 (a∧c) and −5≤x≤5 (b∧c) hold as preconditions.

A verification process of the result using unit 115 executed in step S16 of FIG. 2 will be described.

The result using unit 115 uses the precondition formed by the partial candidate set stored in the result storage 114 and the postcondition in the postcondition storage 102 to perform various program verifications. For example, the precondition and the postcondition can be used to verify a program "D" that includes (invokes) the program "C" as a subroutine. The program "C" is a program having been used to obtain the precondition.

A program verification technique is known in which the program "C" assumes that the given specifications (precondition and postcondition) are met, and the program "D" can be verified without stepping into the implementation of the program "C" at all.

Therefore, in the inspection of the program "D" using the verification technique, the precondition obtained in the present apparatus and the postcondition can be used as the specifications of the program "C" to verify the program "D" without stepping into the implementation of the program "C".

Figure 4:
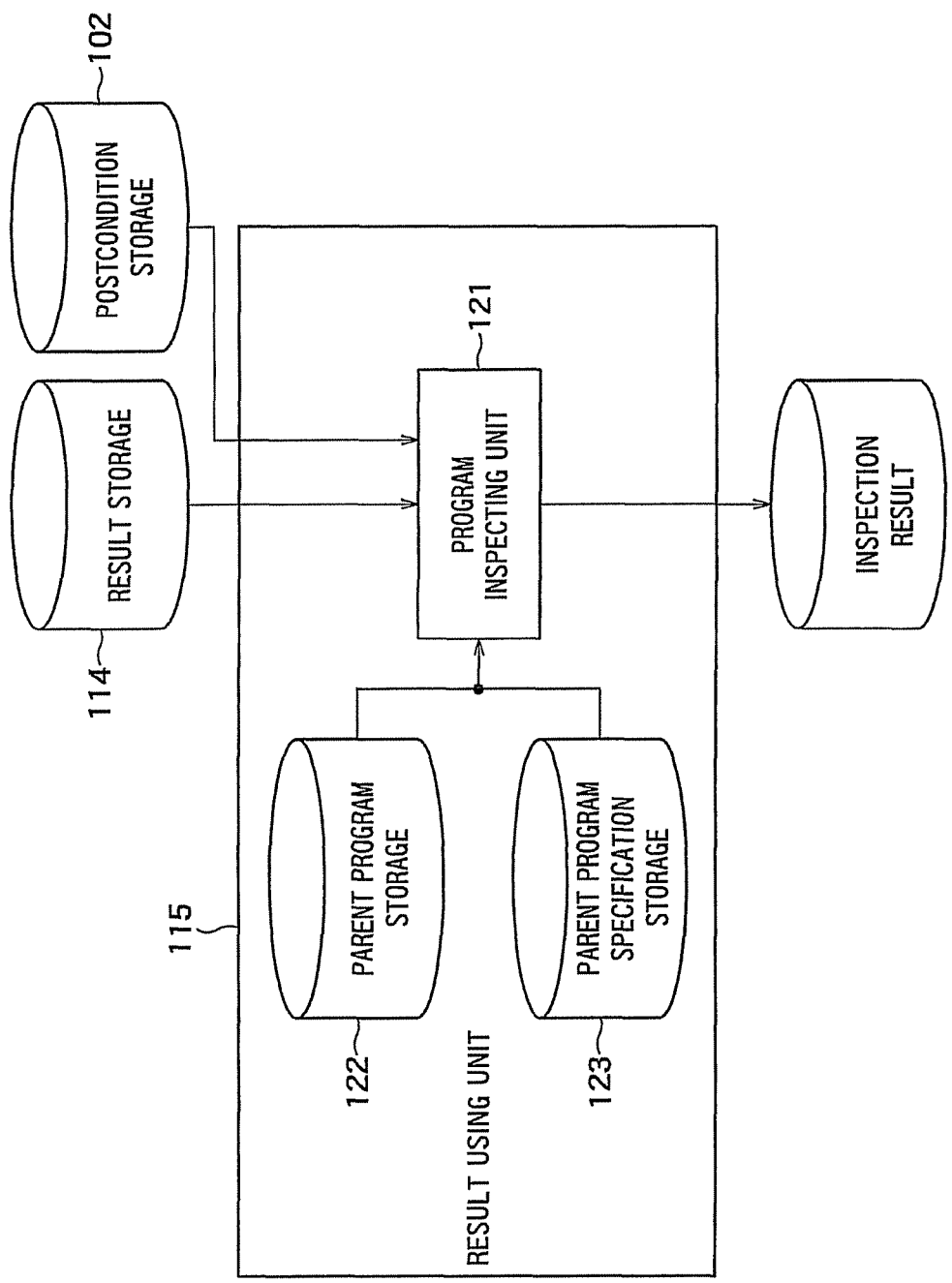
FIG. 4 is a detailed block diagram of a result using unit.

FIG. 4 shows a detailed block configuration of the result using unit 115.

Figure 9:
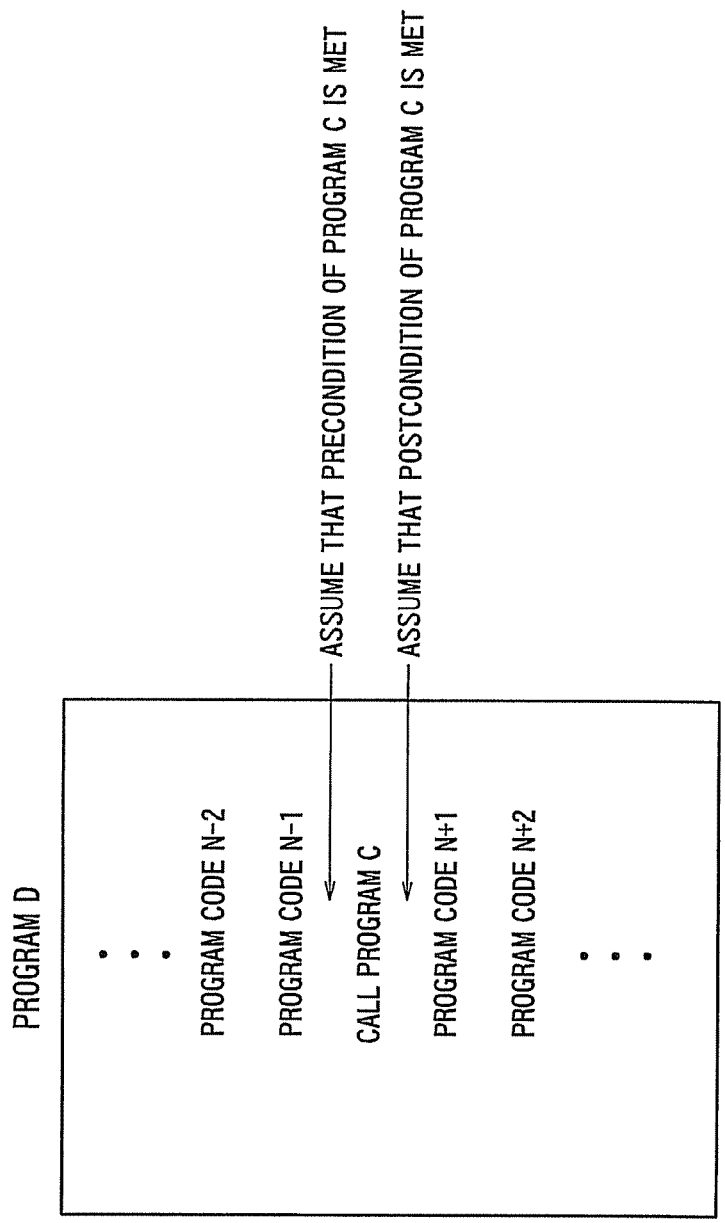
FIG. 9 is a diagram for explaining a process of a result using unit.

A parent program storage 122 stores the program "D" (parent program), and a parent program specification storage 123 stores the specifications (precondition and postcondition) of the program "D". As shown in FIG. 9, the program "D" internally invokes the program "C" as a subroutine. A program inspecting unit 121 inspects whether the program "D" stored in the parent program storage 122 satisfies the specifications stored in the parent program specification storage 123.

Specifically, the program inspecting unit 121 inspects whether a proposition that the postcondition of the program "D" is met just after the execution of the program "D" when the precondition of the program "D" is met holds. The inspection is performed by searching for a counterexample of the proposition. More specifically, assuming that the precondition is "Q", the postcondition is "R", and the program is "D", the inspection is performed by searching for a counterexample of "{Q}D{R}". If there is a counterexample, it is determined that the proposition does not hold. The search of the counter example of "{Q}D{R}" is performed by, for example, finding values (for example, values of variables) with which the precondition "Q" is met before the execution of the program "D" and the postcondition "R" is not met after the execution. If there is such an example of execution, "{Q}D{R}" is not met.

An example of the method that can be used to perform the search includes a method by a group of Daniel Jackson, et al., of Massachusetts Institute of Technology of the United States of America (Greg Dennis, Felix Sheng-Ho Chang, and Daniel Jackson. Modular verification of code with sat. In ISSTA '06: Proceedings of the 2006 international symposium on Software testing and analysis, pp. 109.120, New York, N.Y., USA, 2006. ACM.). Forge (http://sdg.csail.mit.edu/forge/) developed by the group can be used as a tool embodying the method. A technique used in model verification can be used as another method. However, details of the methods are not principal objects of the present embodiment and will not be described anymore here.

As for the part of the program "C" used in the program "D" in the verification of the parent program "D", the implementation of the program "C" is not referenced, and the inspection is performed by assuming that the program "C" meets the precondition (logical expression set in the result storage 114) and the postcondition.

More specifically, as shown in FIG. 9, the program inspecting unit 121 performs the inspection by assuming that the program "C" (subroutine) included in the program "D" meets the precondition and the postcondition of the program "C".

As a result, the parent program "D" can be efficiently inspected in a short time.

If there are a plurality of logical expression sets in the result storage 114 (i.e. if there are a plurality of preconditions), the result using unit 115 may make the user designate a logical expression set (precondition) to be used for the verification through an input interface. Alternatively, the result using unit 115 may arbitrarily select a set in the result storage 114 to use the precondition indicated by the selected set.

In another example of the verification performed by the result using unit 115, a human user checks and determines whether there is no divergence between the precondition and the postcondition of the program "C" or "D" and the original (described in natural language) specifications of the program "C" or "D". If it is determined that there is a divergence, there is a problem in at least one of the specifications and the program, and one or both of the specifications and the program would be corrected.

In general, programs describe procedures, while specifications describe properties to be satisfied. Therefore, the ways the programs and the specifications are written are totally different, and whether there is a divergence between the program and the specifications is difficult to determine. However, according to the method, more declarative conditional descriptions, such as the precondition and the postcondition, can be compared with the specifications to more easily determine whether there is a divergence.

Figure 6:
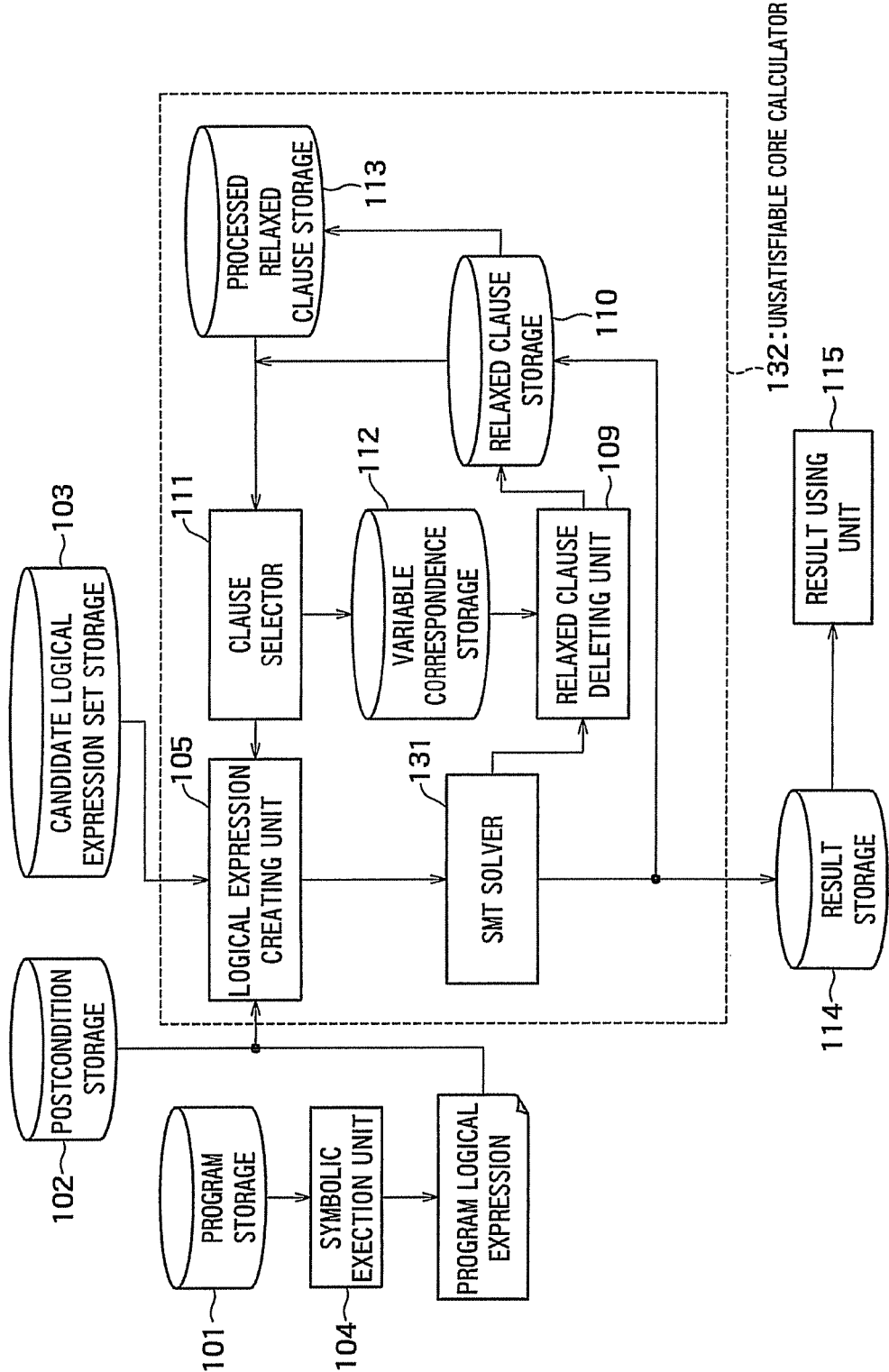
FIG. 6 is a block diagram showing another example of a configuration of the precondition generating apparatus.

FIG. 6 is a block diagram showing a modified example of the precondition generating apparatus shown in FIG. 1.

An SMT (SAT Modulo Theories) solver 131 replaces the propositional logic expression converter, the SAT solver, and the logical expression restoring unit of FIG. 1. The elements other than the SMT solver 131 are the same as in FIG. 1, and the detailed description will not be repeated.

What the SMT solver is like will be described first.

The SMT solver is a solver that solves an SMT problem (SAT Modulo Theories problem) for solving a satisfiability problem in a theoretical system that can easily describe more complicated constraints than in the propositional logic expression. The SMT solver is being developed according to the progress of the SAT solver. The SMT solver handles, as an input, a logical expression that can be interpreted by a system of axioms (theory) described by first-order logic and obtains a solution that makes the logical expression true. Many of the SMT solvers internally convert the input logical expression to a propositional logic expression, and whether the propositional logic expression is satisfied is checked by the SAT solver. Non Patent Literature 4 (Alessandro Cimatti, Alberto Griggio, Roberto Sebastiani: A Simple and Flexible Way of Computing Small Unsatisfiable cores in SAT Modulo Theories. SAT 2007:334-339) proposes a method of obtaining the unsatisfiable core by the SMT solver, instead of the SAT solver.

The SMT solver 131 of FIG. 6 also handles, as an input, a logical expression that can be interpreted by the system of axioms (theory) described by first-order logic. Specifically, the logical expression "F" created by the logical expression creating unit 105 is handled as an input. A satisfiable problem that makes the input logical expression true is solved, and a solution that makes the logical expression true is obtained. If there is no such a solution, an unsatisfiable core is obtained.

An example of the SMT solver that interprets a Boolean expression (logical expression) output by the symbolic execution unit 104 includes MathSAT (http://mathsat.itc.it/). A document (http://sat07.ecs.soton.ac.uk/slides/griggio-sat07-talk.pdf) by the writers of Non Patent Literature 3 introduces an example of applying the method described in Non Patent Literature 4 to MathSAT to enable outputting the unsatisfiable core.

As described, according to the present embodiment, the precondition of the program can be efficiently acquired by implementing the process using the relaxed clause set and the processed relaxed clause set while using the function of the SAT solver or the SMT solver. For example, one partial candidate set can be listed each time the process of step S12 of FIG. 2 is executed, while preventing overlapped calculation of the same calculation result (partial candidate set). The algorithm of the present embodiment is an order of $O(n^2)$ excluding the amount of calculation by the SAT solver. Among the solutions in $2^n$ combinations under ordinary circumstances, only n combinations at most need to be found, and fewer calculations are required.

According to the present embodiment, the precondition acquired for the program "C" and the previously given postcondition can be used to efficiently verify a program "D" including the program "C".

The precondition generating apparatus in FIG. 1 or 6 may also be realized using a general-purpose computer device as basic hardware. That is, the elements 104-109, 110, 111, 131, 132 can be realized by causing a processor mounted in the above described computer device to execute a program. In this case, the apparatus may be realized by installing the above described program in the computer device beforehand or may be realized by storing the program in a storage medium such as a CD-ROM or distributing the above described program over a network and installing this program in the computer device as appropriate. Furthermore, the storage 101-103, 110, 112, 113 may also be realized using a memory device or hard disk incorporated in or externally added to the above described computer device or a storage medium such as CD-R, CD-RW, DVD-RAM, DVD-R as appropriate.

The invention claimed is:

1. A precondition generating apparatus comprising:
   a symbolic execution unit configured to perform symbolic execution on a program described by an imperative programming language to obtain a program logical expression;
   a first storage configured to store a set "S" of a plurality of logical expressions "A"s, the logical expressions "A"s being described using variables included in the program;
   a second storage configured to store a logical expression "B" that is described using variables included in the program, the logical expression "B" indicating a postcondition of the program;
   a logical expression creating unit configured to create a first logical expression that is a logical product of the logical expressions "A", the program logical expression and a negation of the logical expression "B";
   a problem solver configured to find a solution that makes the first logical expression true and if the solution does not exist, specify a set of clauses that cannot be simultaneously true in the first logical expression;
   a third storage configured to store a set of all of logical expressions "A"s included in the set of the clauses as indicating a first precondition of the program; and
   a fourth storage configured to store the set of all of the logical expressions "A"s as a relaxed clause set "N1", wherein
   the logical expression creating unit
   (A1) sets relaxing variables having values of true or false for the logical expressions "A"s belonging to the relaxed clause set "N1",
   (B1) acquires a set "NN1" that is a set of logical expressions being logical sums between the logical expressions "A"s belonging to the relaxed clause set "N1" and the relaxing variables,
   (C1) if a number of the logical expressions "A"s belonging to the relaxed clause set "N1" is two or more, acquires a logical sum of negations of the relaxing variables as a variable selection clause "v1", and
   (D1) generates a second logical expression that is a logical product following items: (a) logical expressions belonging to a set "S−N1" that the relaxed clause set "N1" is subtracted from the set "S", (b) logical expressions belonging to the set "NN1", (c) the variable selection clause "v1", (d) the program logical expression, and (e) a negation of the logical expression "B",
   the problem solver finds a solution that makes the second logical expression true and if the solution does not exist, specifies a set of clauses that cannot be simultaneously true in the second logical expression and
   the third storage stores a set of all of logical expressions "A"s included in the set of the clauses specified for the second logical expression as indicating a second precondition of the program.

2. The apparatus according to claim 1, further comprising a relaxed clause deleting unit configured to delete, if the solution of the second logical expression is found and if the solution of the second logical expression includes a relaxing variable of true, a logical expression "A" corresponding to the relaxing variable of true from the relaxed clause set "N1" wherein
   the logical expression creating unit uses the relaxed clause set "N1" after deletion of the logical expression "A" to execute process of:
   (A1) setting relaxing variables having values of true or false for the logical expressions "A"s belonging to the relaxed clause set "N1",
   (B1) acquiring a set "NN1" that is a set of logical expressions being logical sums between the logical expressions "A"s belonging to the relaxed clause set "N1" and the relaxing variables,
   (C1) if a number of the logical expressions "A"s belonging to the relaxed clause set "N1" is two or more, acquiring a logical sum of negations of the relaxing variables as a variable selection clause "v1" and
   (D1) generating a second logical expression that is a logical product following items: (a) logical expressions belonging to a set "S-N1" that the relaxed clause set "N1" is subtracted from the set "S", (b) logical expressions belonging to the set "NN1" (c) the variable selection clause "v1", (d) the program logical expression, and (e) a negation of the logical expression "B".

3. The apparatus according to claim 2, wherein
   the fourth storage stores the set of all of logical expressions "A"s included in the set of the clauses specified for the second logical expression as a relaxed clause set "N2",
   the logical expression creating unit
   (A2) sets relaxing variables having values of true or false for logical expressions "A"s belonging to a sum of the relaxed clause sets "N1" and "N2",
   (B2) acquires a set "NN2" that is a set of logical expressions being logical sums between the logical expressions "A" belonging to the sum of the relaxed clause sets "N1" and "N2" and the relaxing variables set for the logical expressions "A"s,
   (C2) if a number of the logical expressions "A"s belonging to the relaxed clause set "N2" is two or more, acquires a logical sum of negations of the relaxing variables set for the logical expressions "A"s as a variable selection clause "v2", and
   (D2) generates a third logical expression that is a logical product of following items: (a) logical expressions "A"s belonging to a set "S−(N1∪N2)" that the set of sums of the relaxed clause sets "N1" and "N2" is subtracted from the set "S", (b) the logical expressions belonging to the set "NN2", (c) the variable selection clauses "v1" and "v2", (d) the program logical expression, and (e) a negation of the logical expression "B",
   the problem solver finds a solution that makes the third logical expression true and if the solution does not exist, specifies a set of clauses that cannot be simultaneously true in the third logical expression and
   the third storage stores a set of logical expressions "A"s included in the set of the clauses specified for the third logical expression as indicating a third precondition of the program.

4. The apparatus according to claim 3, wherein
   the relaxed clause deleting unit deletes, if the solution of the third logical expression is found and if the solution of the third logical expression includes a relaxing variable of true, a logical expression "A"s corresponding to the relaxing variable of true from the relaxed clause set "N2", and the logical expression creating unit uses the relaxed clause set "N2" after the deletion of the logical expression "A" to execute the process of (A2) to (D2).

5. The apparatus according to claim 4, further comprising:
a fifth storage configured to store a parent program that includes the program;
a sixth storage configured to store a precondition and a postcondition of the parent program; and
a program inspecting unit configured to inspect whether a proposition holds that the postcondition of the parent program is met just after execution of the parent program when the precondition of the parent program is met and configured to determine that the proposition does not hold if there is a counterexample of the proposition and to determine that the proposition holds if there is no counterexample of the proposition, wherein
the program inspecting unit inspects the parent program on assumption that the program satisfies at least one of the first, second and third precondition of the program and the postcondition of the program.

* * * * *